Aug. 13, 1929.   H. D. JAMES   1,724,404
SERIES MOTOR CONTROL SYSTEM
Filed Dec. 24, 1927

INVENTOR
Henry D. James.
BY
Berleigh S. Carr
ATTORNEY

Patented Aug. 13, 1929.

1,724,404

UNITED STATES PATENT OFFICE.

HENRY D. JAMES, OF EDGEWOOD, PENNSYLVANIA, ASSIGNOR TO WESTINGHOUSE ELECTRIC & MANUFACTURING COMPANY, A CORPORATION OF PENNSYLVANIA.

SERIES MOTOR-CONTROL SYSTEM.

Application filed December 24, 1927. Serial No. 242,302.

My invention relates generally to a system of control for series motors and particularly to regulating the speed of a series motor by connecting a section of the field winding in parallel with the armature.

In the operation of a series motor under certain conditions of load, it is often impossible to obtain the desired speed regulation of the motor since the current drawn by the armature also flows through the entire field winding. When a series motor is operated under very light load or at no load, some precaution must be taken to prevent the motor from running away.

My invention provides a method of control for a series motor wherein the field winding is divided into two separate sections, one of which is disposed to be connected in series with the armature when operating in one direction and the other of which is disposed to be connected in series with the armature when operating in the opposite direction.

In order to obtain the desired speed regulation, the portion of the field winding not connected in series with the armature may be connected in series with a resistor and in parallel with the armature so that the excitation of the field may be varied and a stronger field obtained when the armature is running at high speed than is possible with the straight series field winding. This change of field excitation makes it possible to limit the speed at which the machine will rotate under no load and also establishes a lower maximum speed for operation under heavy loads.

The object of my invention, generally stated, is to provide a method of control for series motors that shall be simple and efficient in operation.

A more specific object of my invention is to provide a method of controlling the speed of a series motor through a divided field winding.

A further object of my invention is to provide a method of connecting either of two separate sections of a series field winding in series with the armature in accordance with the direction of rotation of a motor and either of which is adapted to be connected in parallel with the armature when the other is connected in series with the armature.

Another object of my invention is to provide a system of control for a series motor wherein dynamic braking is accomplished through a section of the field winding other than that previously connected in series with the armature.

Other objects of my invention will become apparent to those skilled in the art when the following description is considered in conjunction with the accompanying drawing in which—

Figure 1:
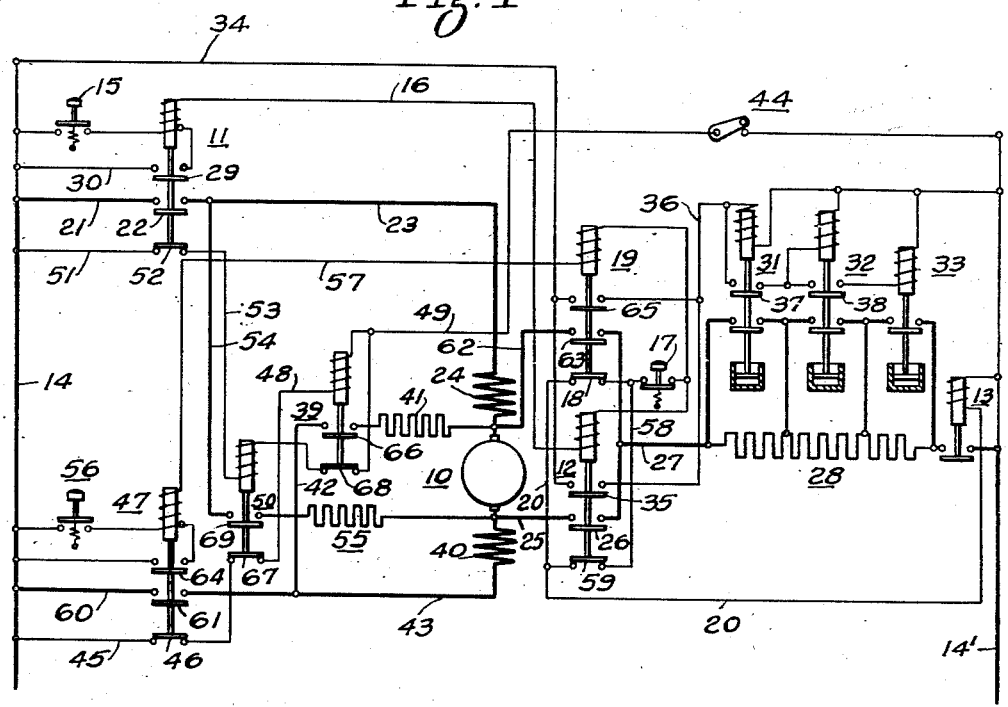
Figure 1 is a schematic view of circuits and apparatus constituting a control system arranged in accordance with this invention.
Figure 2:
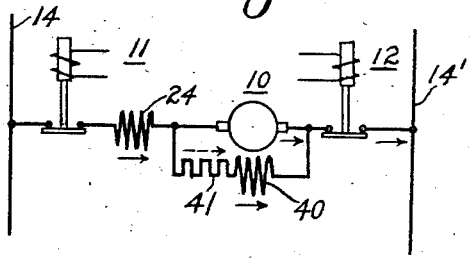
Fig. 2 is a simplified view illustrating the circuit connections of the apparatus illustrated in Fig. 1 when the motor is operating in one direction.
Figure 3:
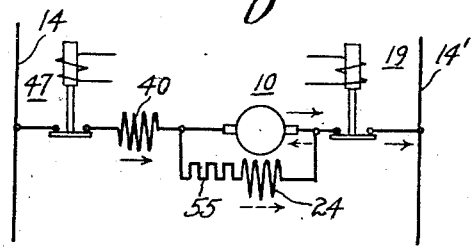
Fig. 3 is a simplified view illustrating the circuit connections of the same apparatus when the motor is operating in the opposite direction.

In order to operate the motor 10 in the forward direction, it may be connected across the supply mains 14 and 14' by means of the switches 11, 12 and 13.

Since the switches 11, 12 and 13 are of the electromagnetic type, an energizing circuit is provided to effect their actuation. This energizing circuit may be controlled at will by means of the push-button switch 15 and, when closed, extends from the positively energized supply line conductor 14 through the push-button switch 15, the operating coil of switch 11, conductor 16, the operating coil of switch 12, push-button switch 17, interlock 18 of switch 19, conductor 20 and the operating coil of switch 13 to the negatively energized supply line conductor 14'.

When the switches 11, 12 and 13 have been closed, the motor 10 is connected to the source of supply through a circuit which extends from the positively energized conductor 14, conductor 21, contact member 22 carried by the switch 11, conductor 23, series field winding 24, the armature of motor 10, conductor 25, contact member 26 carried by the switch 12, conductor 27, the starting resistor 28, and switch 13, to the negatively energized conductor 14'.

The switches 11, 12 and 13 are retained in their closed positions after the release of the push-button switch 15 by a holding circuit which is established upon the closure of the switch 11. As shown, the interlock 29 of the switch 11, in conjunction with the conductor 30, provides a circuit paralleling the push-button switch 15. Therefore, upon the closure of the switch 11, a holding circuit is established through interlock 29, and the push-button switch 15 may be released without interrupting the supply of energy to the operating coils of the switches 11, 12 and 13.

It is always desirable that the starting voltage of a motor be of considerably less magnitude than the voltage on which the motor is to operate continuously and the starting resistor 28 is provided to control the voltage. In operation, the resistor 28 is gradually cut out of the motor circuit by the successive operation of the switches 31, 32 and 33, each of which is disposed to short-circuit a resistor section. The switches 31, 32 and 33 are each magnetically operated and arranged so that a predetermined interval of time elapses between the energization of their respective coils and the closure of their respective contact members.

The energizing circuit for the switches 31, 32 and 33 is closed upon the closure of the switch 12 and remains closed as long as either of switches 12 and 19 is retained in its closed position. Upon the closure of the switch 12, an energizing circuit for the switch 31 is established which may be traced from the positively energized conductor 14 through conductor 34, interlock 35 of switch 12, conductor 36, the operating coil of switch 31, to the negatively energized conductor 14'.

When the switch 31 is closed, an energizing circuit for the switch 32 is completed through the interlock 37 and may be traced from the energized conductor 36 through interlock 37 carried by the switch 31, the operating coil of switch 32, to the negatively energized conductor 14'. Upon the closure of the switch 32, an energizing circuit for the switch 33 is established and extends from the energized conductor 36 through the interlock 37, carried by the switch 31, interlock 38 carried by switch 32, and the operating coil of switch 33, to the negatively energized conductor 14'. Since the switches 31, 32 and 33 are arranged to operate in a predetermined sequence, with an appreciable time interval between the closing operations, the desired time delay in cutting out the starting resistor is effected and the motor 10 will, at no time, draw excessive starting currents.

If the motor 10 is operated under an exceptionally light load, so that it continues to accelerate, it is desirable that the field excitation be increased to prevent the motor from running away and this is accomplished through the closure of the switch 39 which functions to connect a section of the series field winding 40 in parallel with the armature of the motor. If this section of the field winding 40 is connected in parallel with the armature when the motor is operating under heavy loads, a lower operating speed is obtainable than was possible through the use of the section 24 alone. The circuit paralleling the armature which is completed through the switch 39 may be traced from the armature of motor 10, through resistor 41, the contact members 66 of switch 39, conductor 42, conductor 43 and the field winding 40 back to the armature of motor 10.

The energizing circuit for the switch 39 is completed through the actuation of the manually operated switch 44 and extends from the positively energized conductor 14, through conductor 45, interlock 46 of the switch 47, interlock 67 of switch 50 in its open position, conductor 48, the operating coil of switch 39, conductor 49, and the manually operated switch 44, to the negatively energized conductor 14'.

When it is desired to stop the operation of the motor 10, the push-button switch 17 is depressed, and the energizing circuit for the switches 11, 12 and 13 is interrupted to permit the switches to open, and the motor 10 to be disconnected from its source of supply.

If the switch 44 remains closed after the motor 10 has been disconnected from its source of supply, dynamic braking is effected, since the motor 10 is short circuited. The braking circuit is established by the closure of the switch 39 and may be traced from the armature through resistor 41, the contact member 66 of switch 39, conductor 42, conductor 43, field winding 40 returning to the armature 10. Therefore, the resistor 41 serves as a braking resistor upon the disconnection of the motor 10 from its source of supply, after being operated in the forward direction.

When it is desired to operate the motor 10 in the reverse direction, the push-button switch 56 is actuated to its closed position, and an energizing circuit for the magnetically operated switches 47, 19 and 13 is established which may be traced from the positively energized conductor 14, through the push-button switch 56, the operating coil of switch 47, conductor 57, the operating coil of switch 19, the push-button switch 17, conductor 58, interlock 59 of switch 12, conductor 20 and the operating coil of switch 13, to the negatively energized conductor 14'.

The motor 10 is connected to its source of supply upon the closure of switches 47, 19 and 13, so that it operates in the reverse direction. The main motor circuit in this case extends from the positively energized conductor 14 through conductor 60, contact member 61 of switch 47, conductor 43, the field winding 40, the armature of motor 10, conductor 62, contact member 63 of switch 19, conductor 27, the starting resistor 28 and the contact members of switch 13 through the negatively energized conductor 14'.

The holding circuit for the switches 47, 19 and 13 is completed by establishing a path parallel to the push-button switch 56 through the interlock 64 of switch 47, exactly as described in connection with the push-button switch 15 and the interlock 29 of switch 11.

Acceleration of the motor in the reverse direction is accomplished, through the operation of switches 31, 32 and 33, to short circuit their corresponding sections of the starting resistor 28, in the manner described in connection with the forward acceleration of the motor. The energizing circuit for the switches 31, 32 and 33, in this case, is completed upon the closure of the interlock 65 of switch 19.

When it is desired to decrease the operating speed while the motor 10 is operating in the reverse direction, the switch 50 may be closed to connect the field winding 24 in parallel with the armature and thereby increase the field excitation. The circuit paralleling the armature which is completed through the switch 50 may be traced from the armature of the motor 10, through resistor 55, contact members 69 of switch 50, conductor 54, conductor 23 and the field winding 24 and back to the armature of motor 10.

The operation of the switch 50 is accomplished through the closure of the manually operated switch 44 which completes the energizing circuit for the electromagnetically operated switch 50, provided the switches 11 and 39 are both in their open positions. The energizing circuit for the switch 50 may be traced from the positively energized conductor 14 by conductor 51, interlock 52 of switch 11, conductor 53, the operating coil of switch 50, interlock 68 of switch 39, by conductor 49, through the manually operated switch 44, to the negatively energized conductor 14'.

If the line switches 13, 19 and 47 are opened and the switch 44 retained in its closed position, the switch 50 remains in its closed position and dynamic braking is effected. The dynamic-braking circuit, which is established under these conditions, may be traced from the armature through field winding 24, conductor 23, conductor 54, contact member 69 of switch 50 and resistor 55 and back to the armature of motor 10. Therefore, the resistor 55 is utilized as a braking resistor upon the disconnection of the motor 10 from its source of power supply after being operated in the reverse direction.

Since it is realized that various modifications of this embodiment may be made without departing from the spirit and scope of my invention, it is intended that the foregoing description shall be construed as illustrative and not in a limiting sense.

I claim as my invention:

1. In a motor-control system, in combination, a motor having an armature and two series field windings, one of said field windings being disposed to be connected in series with the armature of said motor for operation in the forward direction and in parallel with the armature for operation in the reverse direction, the other of said field winding being disposed to be connected in parallel with the armature for operation in the forward direction and in series with the armature for operation in the reverse direction, and a plurality of resistors disposed to be connected in series with the respective field winding sections when connected in parallel with the armature, said resistors and field windings when connected in series-parallel circuit with the armature effecting dynamic braking when the motor has been deenergized.

2. In combination, a source of power supply, a motor having an armature and a series field winding, comprising a plurality of sections, means for connecting a resistor in series with either section of said field winding, means for connecting said resistor and said section of the field winding in parallel with the armature, the other section of said field winding being connected in series with the armature winding, means for reversing the relative connections of the sections of the field winding thereby reversing the operation of the motor, and means for connecting one section of the field winding in series with a resistor and in parallel with the armature to effect dynamic braking upon the motor being disconnected from the source of supply.

3. In a motor control system, in combination, a motor having an armature and two series field windings, resistors, means for connecting one of said series field windings and one of said resistors in series circuit relation and in parallel circuit relation to the armature, said connection constituting a parallel circuit, and connecting the other of said series field windings in series circuit relation to the parallel circuit whereby operation of the motor in one direction is effected, and means for connecting the other of said series field windings and another resistor in series circuit relation and in parallel with the armature, said connection constituting a parallel circuit to effect a reverse operation of the motor, and connecting said one field winding in series circuit relation to the reverse-operation parallel circuit.

In testimony whereof, I have hereunto subscribed my name this 13th day of December, 1927.

HENRY D. JAMES.